(12) United States Patent
Henning

(10) Patent No.: US 6,637,800 B2
(45) Date of Patent: Oct. 28, 2003

(54) TARP COVER HOLD DOWN SYSTEM

(76) Inventor: Steven A. Henning, 5343 S. New Columbus Rd., Anderson, IN (US) 46013

( * ) Notice: Subject to any disclaimer, the term of this patent is extended or adjusted under 35 U.S.C. 154(b) by 22 days.

(21) Appl. No.: 10/047,591

(22) Filed: Jan. 14, 2002

(65) Prior Publication Data

US 2002/0140249 A1 Oct. 3, 2002

Related U.S. Application Data

(63) Continuation of application No. 09/330,143, filed on Jun. 11, 1999, now Pat. No. 6,338,521.

(51) Int. Cl.[7] .................................................. B60P 7/04
(52) U.S. Cl. ............................. 296/100.15; 296/100.14; 296/100.16; 296/98
(58) Field of Search ............................. 296/98, 100.14, 296/100.15, 100.16

(56) References Cited

U.S. PATENT DOCUMENTS

| | | | | |
|---|---|---|---|---|
| 4,505,512 A | * | 3/1985 | Schmeichel et al. | 296/98 |
| 5,031,955 A | * | 7/1991 | Searfoss | 296/98 |
| 5,125,713 A | * | 6/1992 | Willingham et al. | 296/98 |
| 5,829,819 A | * | 11/1998 | Searfoss | 296/98 |
| 5,887,937 A | * | 3/1999 | Searfoss | 296/98 |
| 5,944,374 A | * | 8/1999 | Searfoss | 296/100.14 |
| 5,957,523 A | * | 9/1999 | Haddad, Jr. | 296/98 |
| 6,338,521 B1 | * | 1/2002 | Henning | 296/100.15 |
| 6,464,283 B2 | * | 10/2002 | Haddad, Jr. | 296/98 |

* cited by examiner

Primary Examiner—D. Glenn Dayoan
Assistant Examiner—H. Gutman
(74) Attorney, Agent, or Firm—Maginot, Moore & Bowman

(57) ABSTRACT

An improved tarp cover system for covering the open-topped container body of a vehicle is characterized by the provision of a generally U-shaped inverted hold-down arm that is pivotally connected with the front wall of the container body and that is spring biased to apply a downward force on the front portion of the cover when the container is in the completely closed condition, thereby to reduce flapping of the cover during transport. The flexible tarp cover is wound on a roll that is rotatably supported adjacent the front wall of the container. In a first embodiment, to cover the container, the free end of the cover is displaced rearwardly of the container by a cover arm that is pivotally connected with the side walls of the container. The cover arm is biased toward its rearmost container covering position by a pair of side mounted spring arrangements that include compression springs that are concealed within the hollow leg portions of the cover arm. A locking arrangement is provided for automatically locking the cover arm in its rearmost position when the tarp completely covers the container. In an alternate embodiment, the cover is unwound from the roll by a transverse member that is manually pulled to the rear of the container by a pull rope. The cover is wound on the roll by an electric motor that is connected with the roll via a planetary gearing arrangement, or by a spring motor.

16 Claims, 10 Drawing Sheets

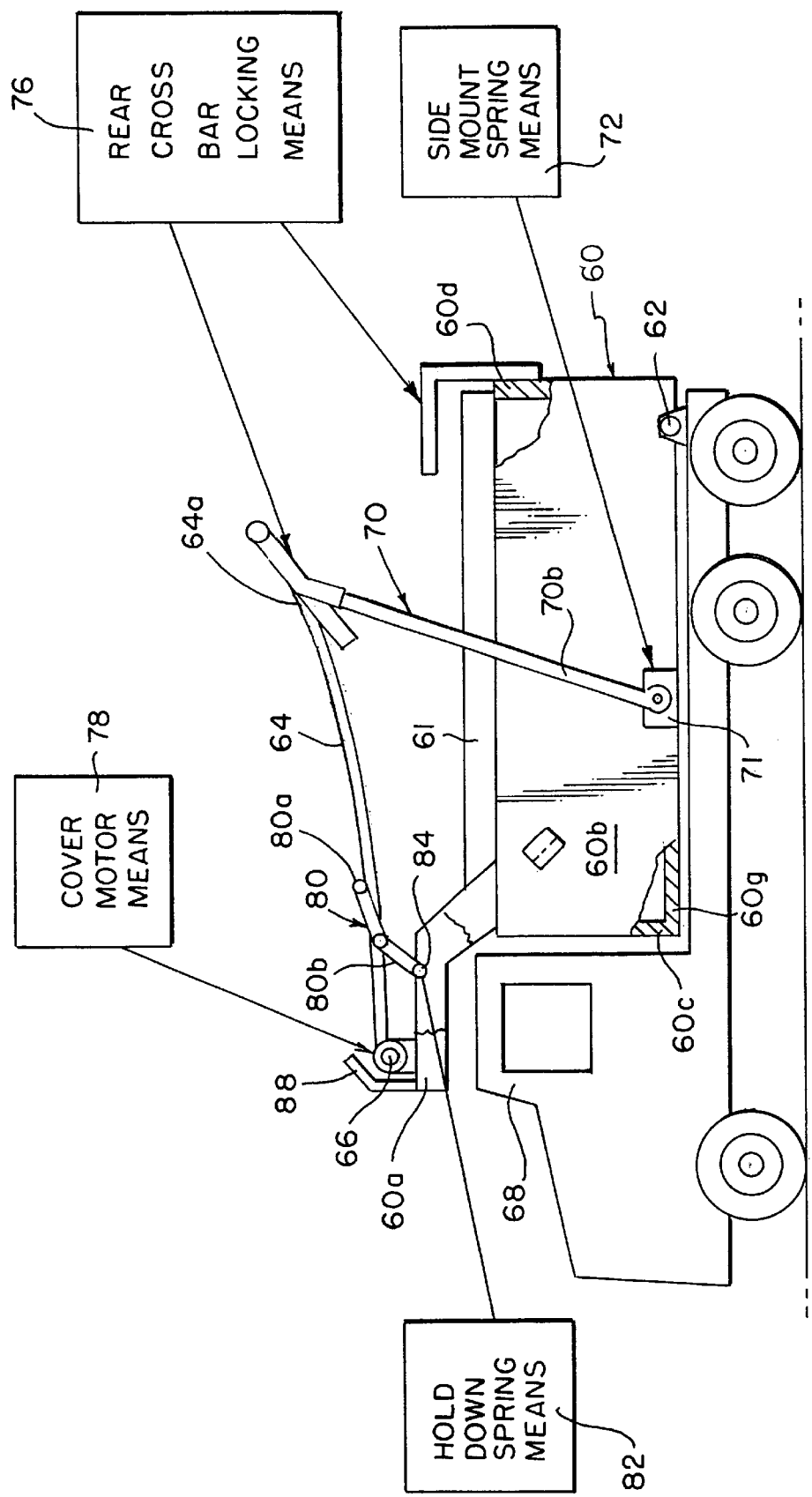

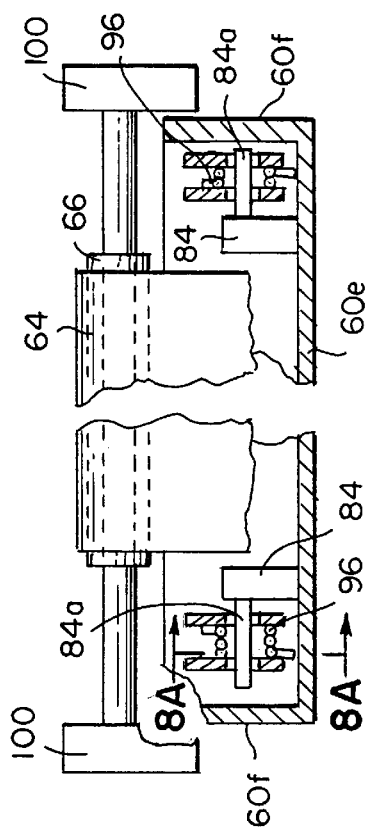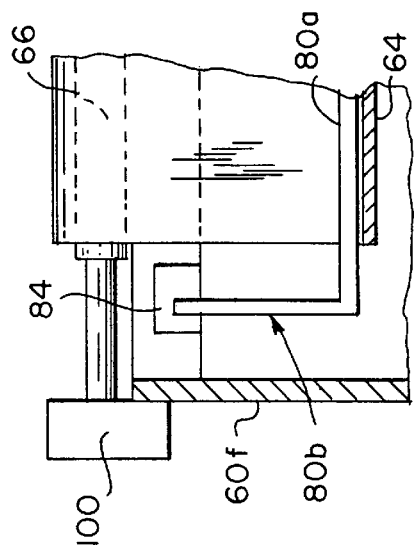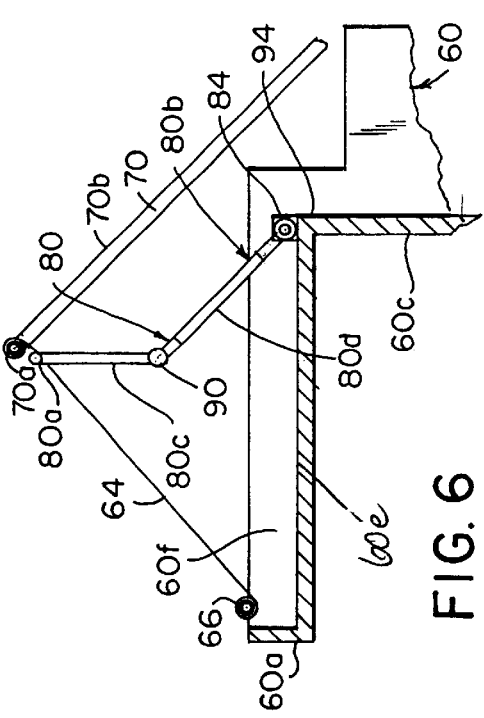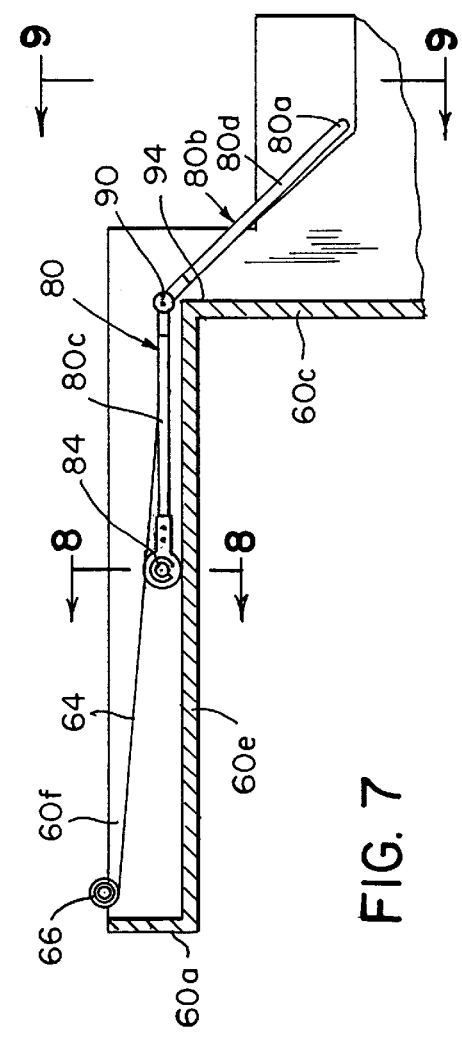

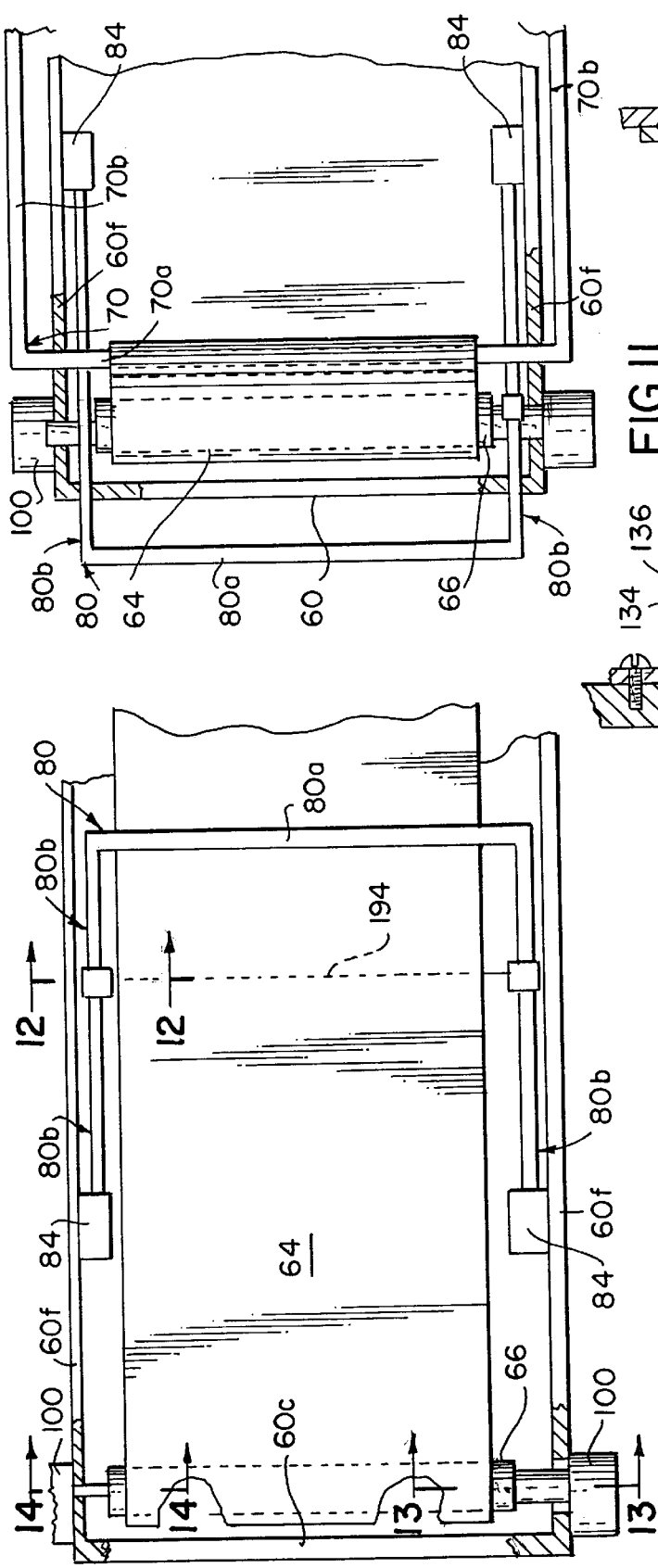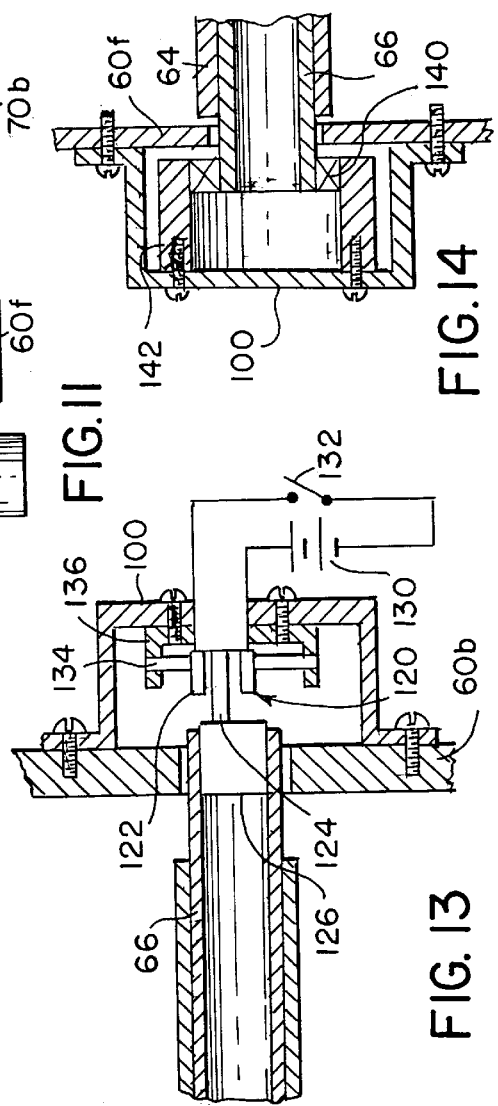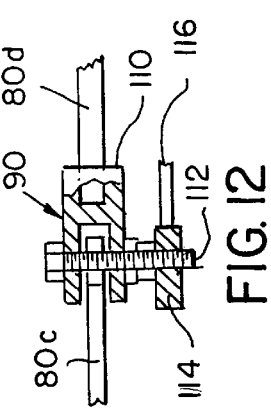

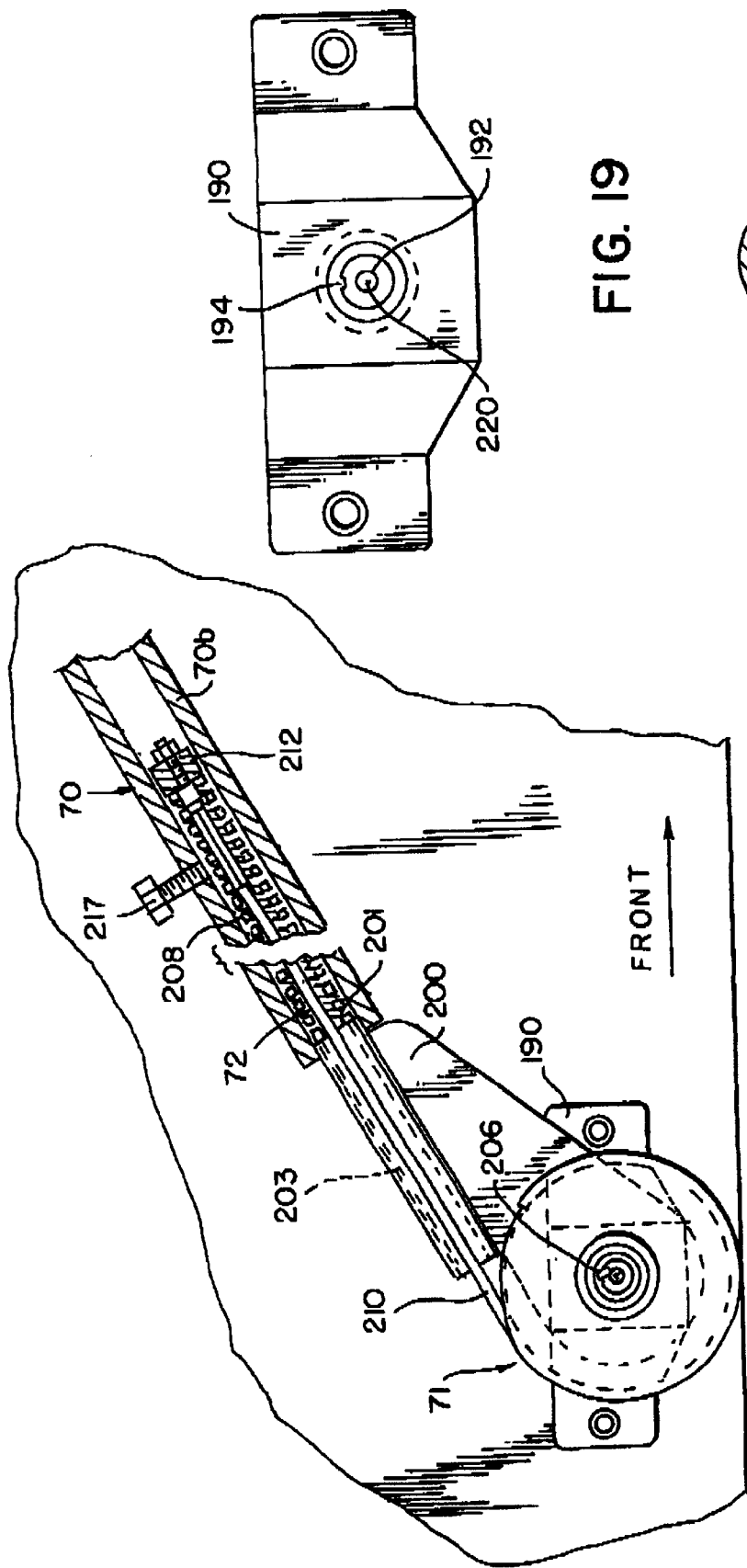

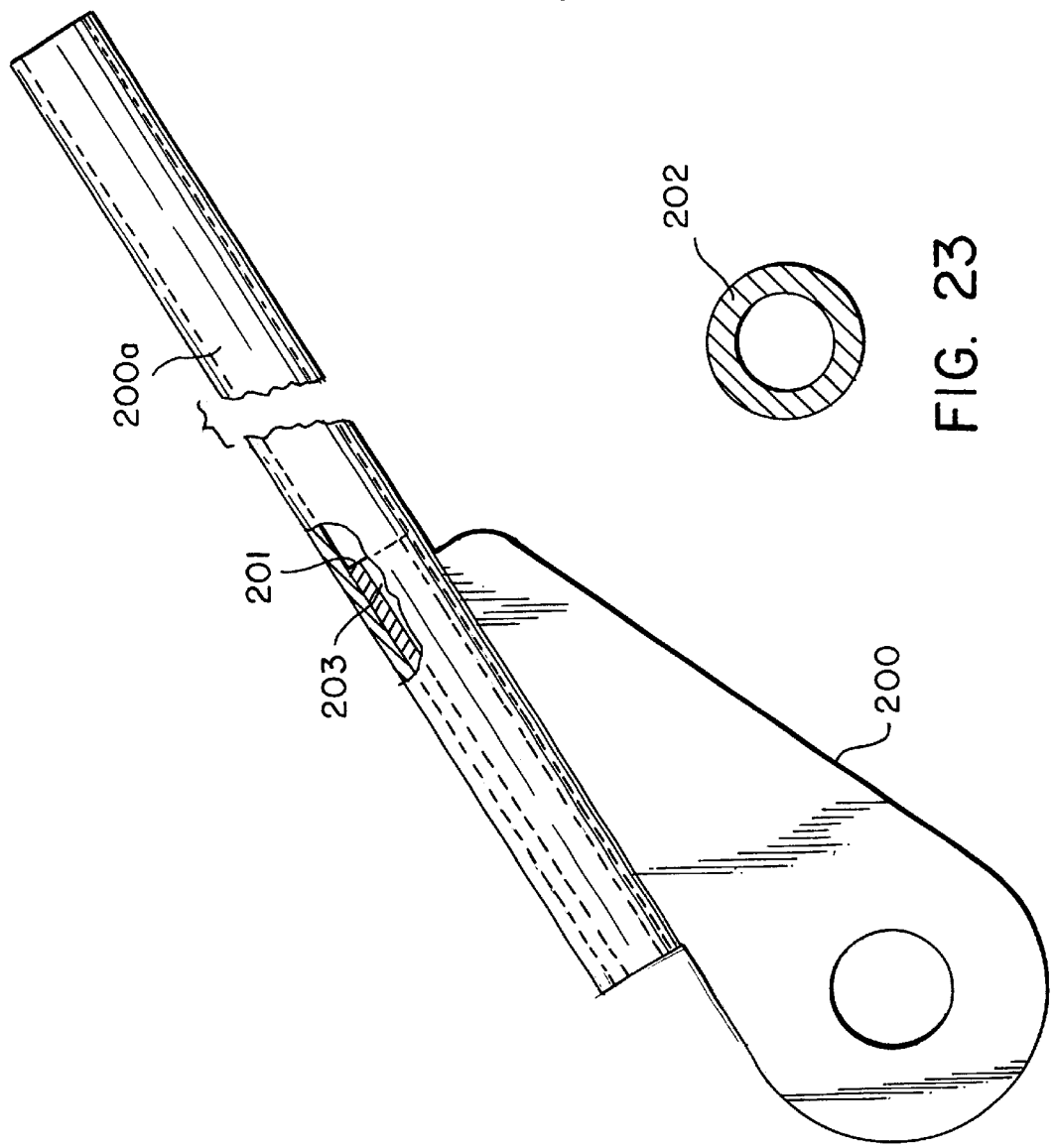

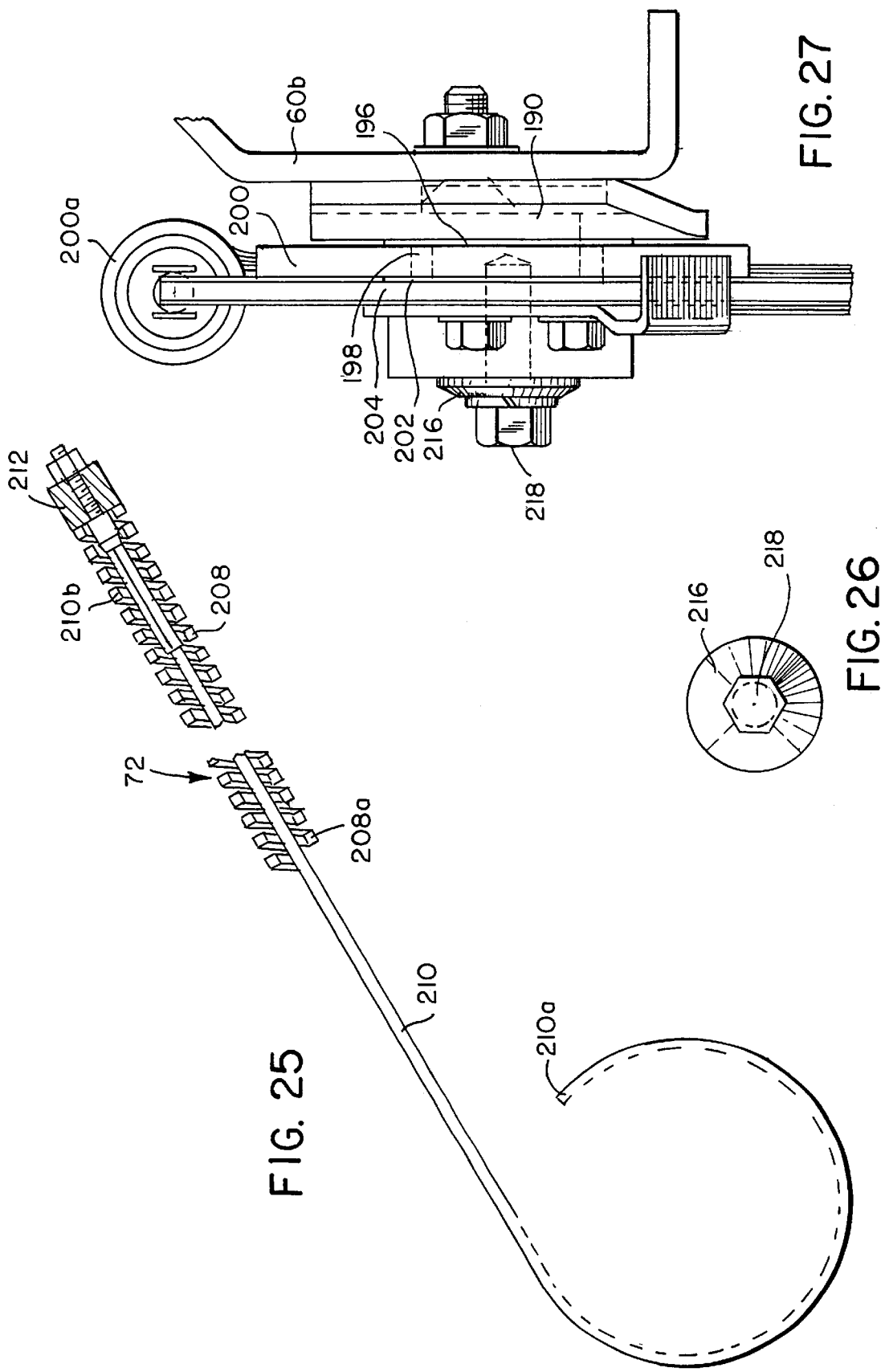

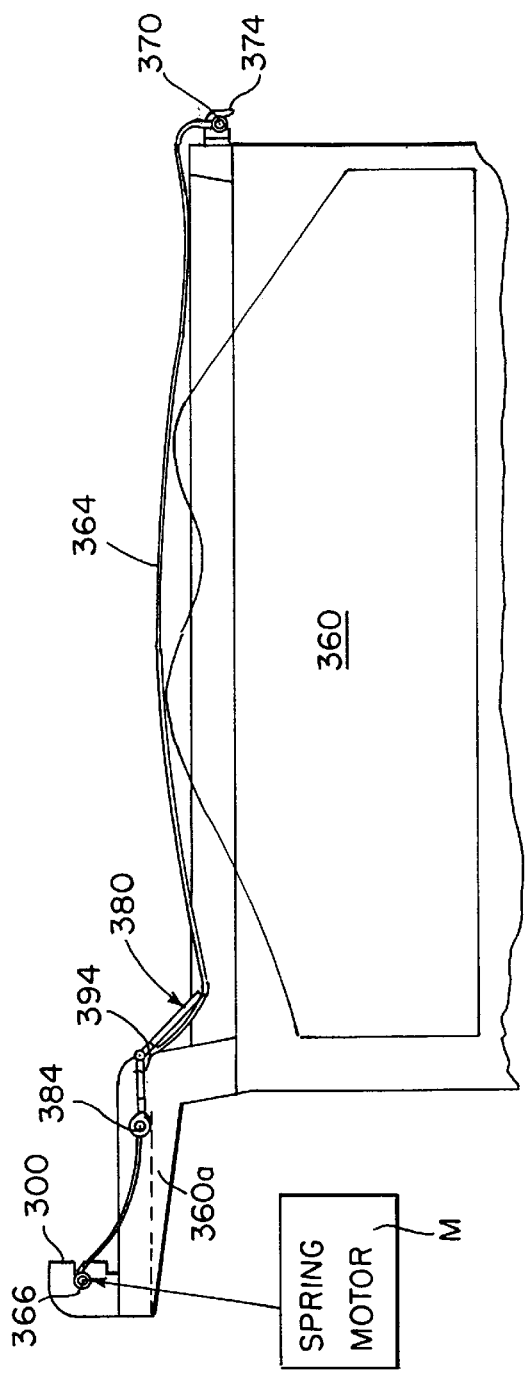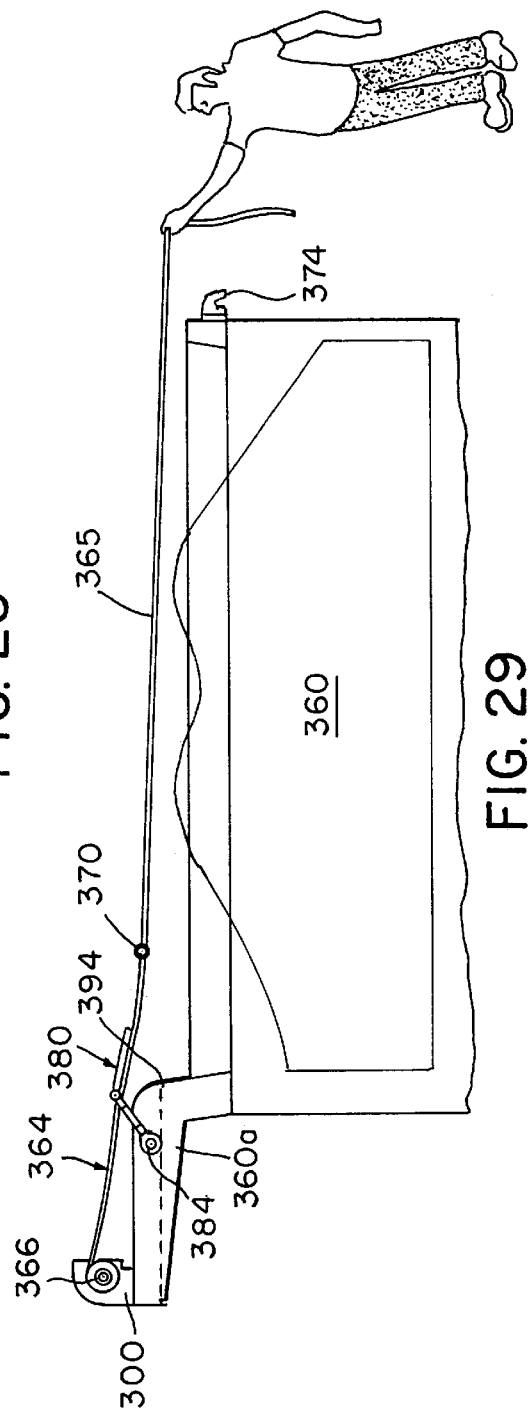

TARP COVER HOLD DOWN SYSTEM

This is a continuation of application Ser. No. 09/330,143, filed Jun. 11, 1999, now U.S. Pat. No. 6,338,521.

BACKGROUND OF THE INVENTION

1. Field of the Invention

A tarp cover system for covering an open-topped vehicle container body includes a hold-down arm that is connected with the front end of the container body for applying downward tension upon the front end of the cover, thereby to reduce flapping of the cover during vehicle transport. The arm has a generally U-shaped inverted configuration and includes a transverse portion that is less than the width of the container body so that the arm can extend downwardly to some extent between the side walls of the container body.

2. Brief Description of the Prior Art

Tarp cover systems for covering the open-topped containers of dump trucks and trailers are well known in the patented prior art, as illustrated by the patents to Searfoss No. 5,031,955, Tuerk No. 4,740,029, and Compton No. 4,516,802, among others. The Tuerk patent addresses the problem of applying tension to the rear portion of the cover to tighten the same when in the container-covering condition, and in the Searfoss patent, tension is applied to the front portion of the cover by a hold-down arm that is pivotally connected with the main cover arm that straddles the container body and is pivotally operable to cover and uncover the container body. In the Compton patent, the main cover arm that is pivotally connected with the container body is spring-biased toward the tarp covering position by exposed spring means.

The present invention was developed to provide an improved tarp cover system in which the hold-down means is operable independently of the cover arm and is operable to extend downwardly to some extent between the side walls of the container body, thereby to improve the hold-down functioning of the cover at the front end of the truck. The spring biasing means for the main cover arm are concealed in protected relation within the legs of the cover arm, and improved means are provided for automatically locking the cover to the container body when the cover arm is in its fully closed covering position. Improved drive-motor/gearing means serve to wind the tarp cover on the cover roll against the biasing force of the spring means.

SUMMARY OF THE INVENTION

Accordingly, a primary object of the present invention is to provide an improved tarp cover system for open-topped vehicle container bodies including a hold-down arm that is pivotally connected with the front end of the container body and is spring-biased to apply a downward tensioning force to the front end of the cover when the cover is in the container-covering condition.

According to a more specific object of the invention, the hold-down arm is of generally U-shaped inverted configuration and includes a transverse portion the length of which is less than the spacing distance of the side walls of the container body, whereby the hold-down arm can extend to some extent downwardly between the side walls, thereby to more positively tension and hold down the front portion of the tarp cover when the tarp is in the container-covering condition. Thus, when the hold-down arm is pivotally connected with the cab shield or ledge portion of a truck body that extends over the cab of the truck, the hold-down arm can be operated to tension the forward portion of the cover against the rear edge of the cab shield portion of the container body, thereby to assure positive hold down of the front portion of the tarp.

In accordance with a further object, the leg portions of the hold-down arm are sectional and include a plurality of angular adjustable sections, thereby to permit desired hold-down operation for various sizes and designs of trucks with which the tarp cover system of the present invention is to be used.

According to another object of the invention, improved side mounted spring means are provided for biasing the main cover arm rearwardly toward its container-covering position, the spring biasing means including compression springs that are concealed within the hollow leg portions of the main cover arm.

A further object of the invention is to provide improved means for automatically locking the main cover arm in its container-covering position.

Still another object of the invention is to provide improved motor/gearing means for winding the tarp cover upon a roll against the biasing force of the side-mounted spring-biasing means associated with the main cover arm.

BRIEF DESCRIPTION OF THE DRAWINGS

Other object and advantages of the invention will become apparent from a study of the following specification, when viewed in light of the accompanying drawings in which:

FIG. 5 is a side view of the improved tarp cover system of the present invention;

FIG. 6 is a detailed sectional view of a first embodiment of the hold-down arm means of the present invention.

FIG. 7 is a detailed sectional view of a second embodiment of the hold-down arm means of the present invention;

FIGS. 8 and 9 are sectional views taken along lines 8—8 and 9—9, respectively, of FIG. 7;

FIG. 10 is a detailed top plan view of the hold-out arm means in the hold-down condition of FIG. 7;

FIG. 11 is a detailed top plan view of the hold-down arm means when maintained in its retracted position by the cover arm means;

FIGS. 12, 13, and 14 are detailed sectional views taken along the lines 12—12, 13—13, and 14—14, respectively, of FIG. 10;

FIG. 18 is a detailed sectional view illustrating the cover arm spring biasing means on the passenger side of the vehicle when in the spring-compressed condition;

FIG. 19 a side view of the bracket means of FIG. 18;

FIG. 20 is a sectional view of the thrust washer means of FIG. 18;

FIG. 22 is a detailed view of the gusset and tube assembly of FIG. 18;

FIGS. 21 and 23 are sectional views of the bearing means of the thrust washer of FIG. 19, and FIG. 24 is a side view of the cast sheave of FIG. 18;

FIG. 25 is an elevational view of the cable and compression spring assembly of FIG. 19;

FIG. 26 is an elevational view of the washer and nut assembly of FIG. 19;

FIG. 27 is a side view of the cover arm biasing means of FIG. 19;

FIG. 28 is a diagrammatic view of a second embodiment of a tarp cover system using the hold-down means of the present invention when in the fully covered condition; and FIGS. 29–31 illustrate the successive steps for uncovering from the container the tarp cover of FIG. 28.

DETAILED DESCRIPTION

Figure 1:
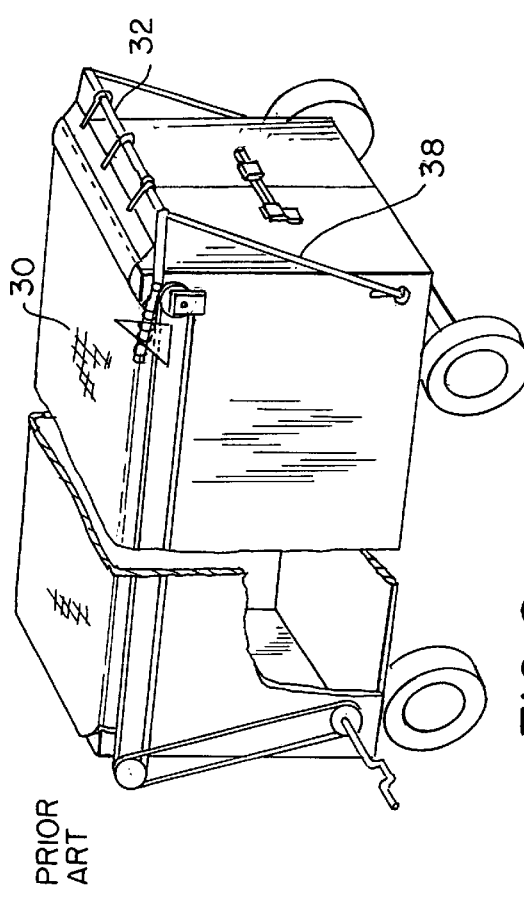
FIG. 1 is a side perspective view of a tarp cover system of the prior art, as illustrated by the Searfoss Pat. No. 5,031,955.

Referring first more particularly to FIG. 1, in the tarp cover system of the prior Searfoss Patent No. 5,031,955, the tarp cover 2 for covering the truck body 4 includes a cover arm 6 having a generally U-shaped inverted configuration including a transverse portion 7 and a pair of leg portions 8 that extend downwardly adjacent the external surfaces of the side walls of the vehicle body. The lower free ends of the legs 8 of the cover arm are connected by pivot means 10 with the lower central portion of the vehicle body. In this system, a second hold-down arm 12 is provided of generally U-shaped inverted configuration having a transverse portion 14 and a pair of downwardly extending leg portions 16 which are connected by pivot means 20 with the legs 8 of the main cover arm 6. Thus, when the cover arm 6 is pivoted rearwardly to the illustrated tarp covering position, the cover 2 is progressively withdrawn from the roll 22 to completely cover the truck body, and the transverse portion 14 of the hold-down arm 12 is displaced to press the front portion of the cover downwardly adjacent the front end of the vehicle body.

Figure 2:
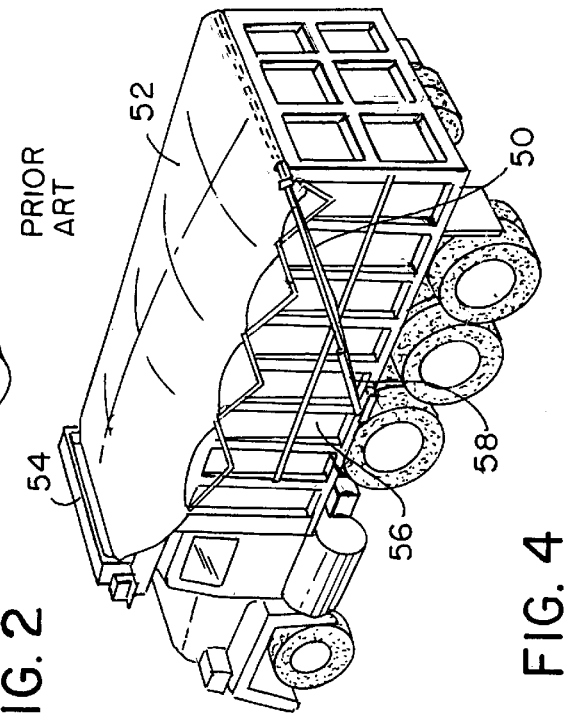
FIG. 2 is a rear perspective view of the truck tarp cover system of the Tuerk Patent No. 4,740,029.
Figure 3:
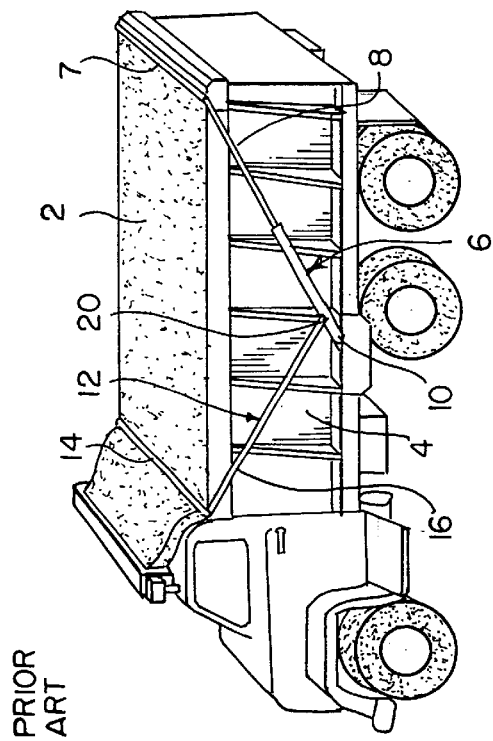
FIG. 3 is a detailed perspective view of the rear portion of the tarp cover system of FIG. 2.

Referring now to FIGS. 2 and 3, in the Tuerk Patent No. 4,740,029, the rear end of the tarp cover 30 is tensioned by means of a generally U-shaped inverted tensioning arm 32 having leg portions that are pivotally connected with a carrier 34 by pivot means 40. When the rear end of the cover 30 and the carrier 34 are displaced rearwardly by the endless cable means 36, upon an application of force to the pull down ropes 38, the tensioning arm 32 is pivoted downwardly to apply tension to the rear portion of the cover as shown in FIG. 2.

Figure 4:
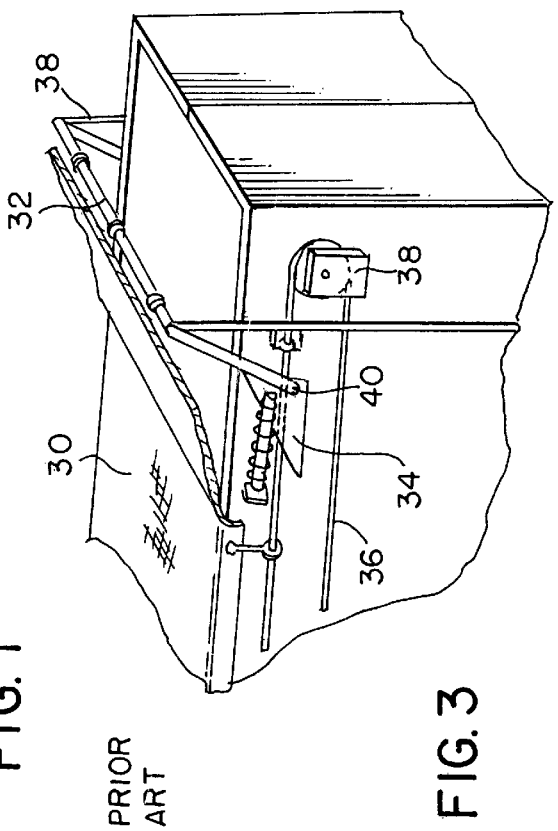
FIG. 4 is a rear perspective view of a tarp cover system of the prior art, as illustrated by the Compton Pat. No. 4,516,802.

Referring to FIG. 4, in the Compton Patent No. 4,516,802, the pivotally connected generally U-shaped cover arm 50 is biased rearwardly by the exposed spring means 58 toward the covering position illustrated in FIG. 4. The cover is withdrawn from roll 54 to cover the cargo area contained between side walls 56.

Referring now to FIG. 5, the tarp cover system of the present invention is operable to cover the open top of a vehicle container body 60 having a front end wall 60c, a pair of side walls 60b, a bottom wall 60g and a rear end wall 60d. Wooden side rails 61 may be provided at the top of the side walls, if desired. In the illustrated embodiment, the vehicle is a dump truck in which the vehicle body 60 is pivoted about the pivot means 62 from its illustrated transport position to a tilted rear discharge position, as is known in the art. The tarp cover 64 is supplied from a roll 66 that is rotatably mounted on the container body cab shield portion 60a that extends above the cab 68. The cover arm 70 is of generally U-shaped inverted configuration (as shown in FIG. 11) having a pair of leg portions 70b that extend downwardly adjacent the external sides of the side walls 60b of the vehicle body 60, respectively. The free end 64a of the cover is connected with the transverse portion 70a (FIG. 11) of the tarp cover arm 70. At their lower ends, the leg portions 70b are pivotally connected with the lower central portion of the vehicle body 60 by pivot means 71 including side mount spring means 72, as will be described in greater detail below. The cover arm 70 is normally spring-biased rearwardly toward a first position in which the open-topped container body is completely covered by the tarp cover 64. As will be described in greater detail below, in accordance with a second feature of the invention, rear cross bar locking means 76 are provided for automatically locking the cover arm in its first tarp covering position, and according to a third feature of the invention, cover motor means 78 are provided for winding the cover on the cover roll 66, whereby the cover arm 70 is pivoted forwardly of the vehicle body 60 toward a retracted position illustrated in FIG. 11.

In accordance with a primary characterizing feature of the invention, spring-biased hold-down arm means 80 are provided for pressing down the forward portion of the cover 64 when the cover arm 70 is in its rearmost first position, thereby to apply a downward directed force to the front portion of the cover and thus prevent flapping of the forward portion of the cover during travel of the vehicle down a highway. The hold-down arm means 80 is of generally U-shaped configuration and includes a transverse portion 80a (FIGS. 10 and 11) and a pair of leg portions 80b that are pivotally connected at their lower ends with the cab shield portion 60a of the vehicle body by pivot means 84 that include the hold-down spring means 82, as will be described below. A conventional wind screen 88 is provided at the forward end of the cab shield portion 60a, thereby to shield the tarp cover roll 66 against the wind during travel of the vehicle.

Referring now to FIG. 6, the hold-down arm means 80 is pivotally connected with the container body by the pivot means 84 adjacent the rear edge 94 of the container body cab shield portion 60a. In accordance with an important feature of the invention, each leg of the hold-down arm means 80 is of sectional construction and includes a pair of leg sections 80c and 80d that are pivotally connected by the adjustment locking means.

Referring now to the modification of FIG. 7, the pivot means 84 for connecting the leg sections 80b of the hold-down arm means 80 are connected with the bottom wall 60e of the cab shield portion 60a forwardly of the rear edge 94. As shown in FIGS. 7 and 10, the length of the transverse portion 80a of the hold-down arm means 80 is less than the spacing distance between the side walls 60b of the vehicle container body 60, whereby when the hold-down arm means 80 is in the hold-down condition of FIG. 7, the transverse portion 80a extends between the container side walls 60b and is at an elevation lower than that of the rear edge 94 of the cab shield portion 60a, thereby to apply hold-down tension to the forward portion of the cover 64 when the cover arm 70 is in its rear most tarp-covering position.

Figure 8B:
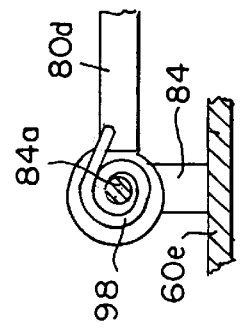
FIG. 8B is a modification of the hold-down spring means of FIG. 8A.
Figure 8A:
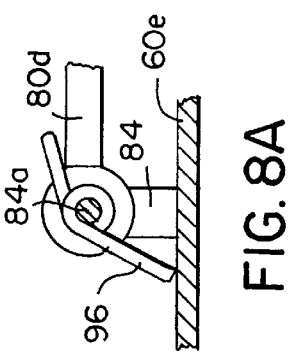
FIG. 8A is a sectional view taken along line 8A—8A of FIG. 8.
Figure 30:
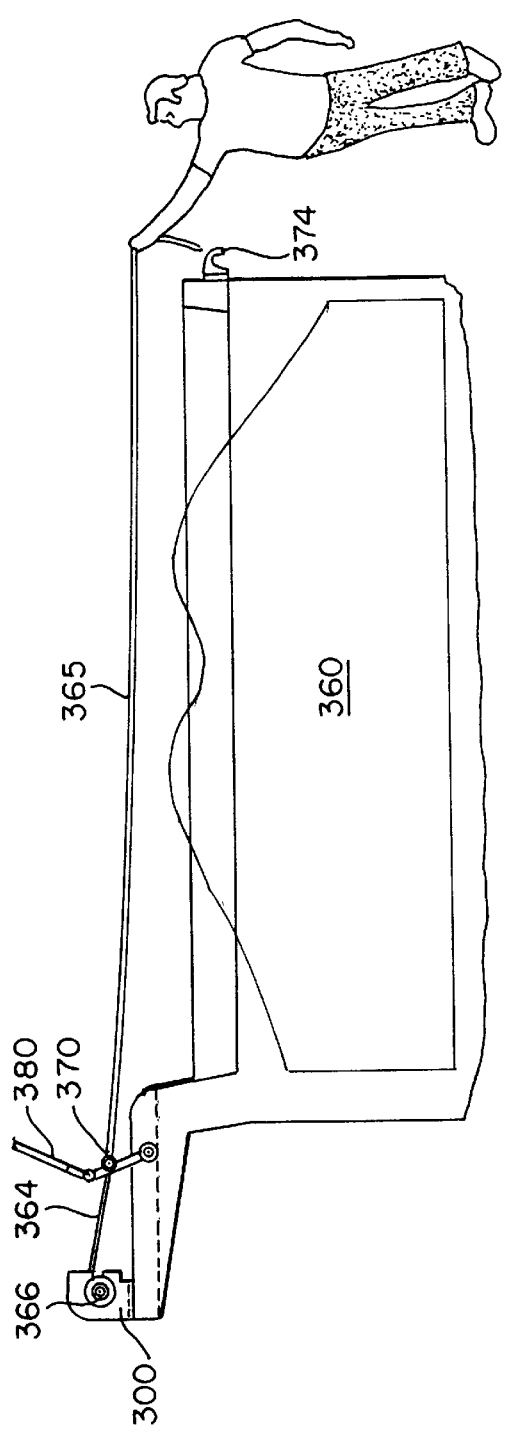

Referring to FIGS. 8 and 9, the pivot support means 84 includes pivot pins 84a about which are pivoted the leg sections 80d of the hold-down arm means 80. Torsion spring means 96 bias the hold-down arm means 80 in the clockwise direction toward the hold-down position illustrated in FIGS. 7 and 9. In the embodiment of FIGS. 8 and 8a, the torsion spring means 96 reacts between the bottom wall 60e of the cab shield portion and the hold-down leg section 80d. In the modification of FIG. 8B, each of the spring means 98 is a spiral spring that reacts between the pivot pin 84a and the section 80d of the hold-down arm means 80. The tarp cover roll 66 is rotatably supported at each end by the support means 100 connected with the walls 60f, as will be described below.

Referring to FIG. 12, the adjustment locking means 90 for pivotally connecting and locking the leg sections 80c and 80d of the hold-down arm means 80 include a bifurcated member 110 that receives the pivot pin 112 about which the section 80c pivots. Upon tightening of the nut 114 upon the threaded pivot pin 112 by the handle means 116, the sections 80c and 80d are adjustably locked in any desired relative orientation.

Referring now to FIGS. 13 and 14, in accordance with an important feature of the invention, the tarp cover roll 66 is rotatably driven by a 12 volt direct-current motor 120 having a stator 122 that is connected with the housing support means 100, and a rotor 124 that is connected with the cover roll 66 by planetary gearing means 126. One example of the motor 120 is the known SOMFY LT motor produced by Somfy Systems, Inc., of Cranbury, N.J. The motor/planetary gearing assembly is electrically driven by the battery 130 in accordance with the actuating position of switch means 132. The motor means 120 is supported from the housing support means 100 by means of support pins 134 and bracket 136, as shown in FIG. 13. At its other end, the tarp cover roll 66 is supported by bearing means 140 and mounting bracket 142, as shown in FIG. 14.

Figure 15:
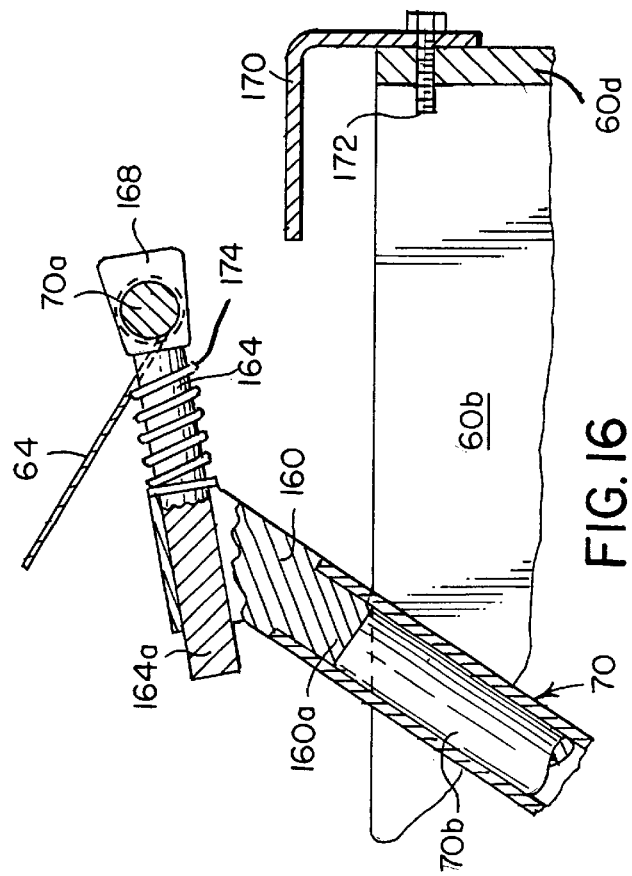
FIG. 15 is a detailed sectional view illustrating the locking means for retaining the cover arm in its rearmost container body covering position.
Figure 16:
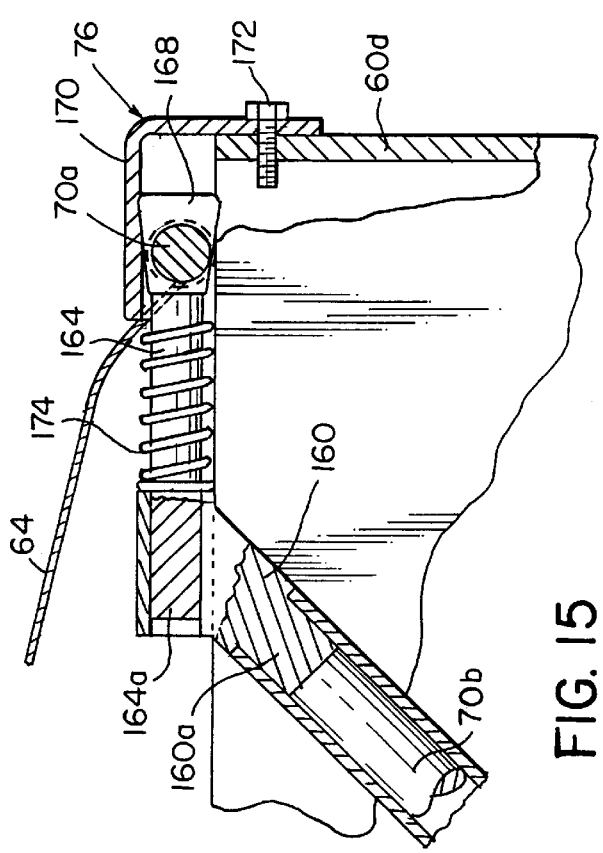
FIG. 16 is a detailed sectional view illustrating the cover arm locking means in its disengaged condition.
Figure 17:
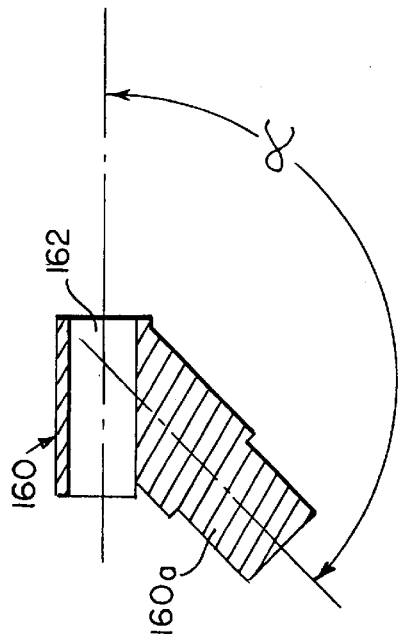
FIG. 17 is a detailed sectional view of the aluminum casting member that forms the support member of the cover arm locking means.

In accordance with another feature of the invention shown in FIGS. 15–17, lock means 76 are provided at the rear wall 60d of the vehicle body 60 for automatically locking the cover arm 70 in its rearmost container-covering first position. To this end, the transverse portion 70a if connected with the leg portion 70b by a self-locking assembly including a pair of case aluminum fittings 160 each having a plug portion 160a adapted for insertion within the associated tubular end portion of the leg portion 70b. At its other end, the fitting 160 contains an angularly-arranged through bore 162 that is arranged at the obtuse angle α (FIG. 17) and which slidably receives the associated end portion 164a of the connecting rod 164. The other end of the connecting rod is connected with the cover arm transverse portion 70a via a locking member 168 that supports the transverse portion for insertion within a corresponding L-shaped bracket 170 that is bolted to the rear wall 60d by the bolt means 172. A compression spring 174 is mounted concentrically about each connecting rod 164, which spring is captured between the fitting 160 and the locking member 168. As shown in FIG. 16, when the motor means 78 is actuated to roll the tarp cover 74 on the roll 66, the tension of the cover causes connected rod 164 and the transverse portion 70a to be displaced to the left relative to each cover arm fitting 160, thereby to compress the compression spring 174 as shown in FIG. 16. The locking member 168 is thereby retracted to withdraw the transverse portion 70a from its position within the L-shaped locking brackets 170, whereupon the cover arm 70 is released for pivotal displacement toward its second retracted position in which the cover 64 is rolled upon the roll 66. During the covering operation, the cover arm 70 is biased in the clockwise direction toward its full covered position shown in FIG. 16, whereupon the cover motor means 78 is deactivated, the tension on cover 64 is released, and compression spring 174 expands to displace the locking member 168 beneath the locking bracket 170, as shown in FIG. 15. Thus, the rear end of the cover 64 and the cover arm 70 are stabilized by the rear cross bar locking means 76.

Referring now to FIGS. 18–27, in accordance with a further object of the present invention, the leg portions 70b of the tarp cover arm 70 are pivotally connected with the lower central side portions of the vehicle body by pivot means 71 centrally arranged adjacent the bottom wall 60g of the vehicle body 60. Each of the pivot means on opposite sides of the vehicle body includes a bracket 190 (FIG. 19) supporting a pivot pin 192 containing a key slot 194. Successively mounted on the pivot pin 192 are a thrust washer 196 (FIG. 20), a bearing 198 (FIG. 21) upon which is rotatably mounted a gusset and tube assembly 200 (FIG. 22), a second thrust washer 202 (FIG. 23), and a stationary sheave 204 (FIG. 24) that is keyed to the pivot pin 192 by the key 206. Mounted within the tubular portion 200a of the gusset and tube assembly 200 is a compression spring 208 (FIG. 25) the lower end 208a of which is seated on a stop defined by the upper edge 201 of a second tube 203 that is inserted concentrically within the tubular portion 200a of the gusset and tube assembly 200. Extending concentrically through the compression spring 208 is a cable member 210 that extends around the circumference of the sheave 204 and has an end portion 210a that is clamped to the sheave 204 by clamping means (not shown). The other end 210b of the cable is connected with a piston 212 that rides within the tubular portion 200a of the gusset and tube assembly 200. Preferably the gusset and tube assembly 200 is formed of a hard metal, such as steel. Finally, a washer 216 and bolt 218 are provided for bolting the parts to the threaded bore 220 contained in the pivot pin 192, as shown in FIG. 27.

Referring again to FIG. 18, assume that the pivot means 71 is on the passenger side of the vehicle, and that the tarp cover arm 70 has been pivoted forwardly toward its second vehicle body uncovering position, whereupon the spring 208 is in a compressed condition owing to the pivotal movement of the gusset and tube assembly 200. The tubular steel portion 200a of the gusset 200 extends concentrically within the lower end of the tubular leg portion 70b of the tarp cover arm 70. The tarp cover arm 70 is normally made of a soft material such as aluminum, or a suitable synthetic plastic material. Set screw 217 secures the lower end of the leg portion 70b with the tubular portion 200a of the stainless steel gusset 200. As shown in FIG. 18, the compression spring 208 is concealed in protected relation completely within the stainless steel tubular portion 200a and within the leg portion 70b of the tarp cover arm 70. If desired, the sheave 204 could be provided with sprocket teeth 204a, and instead of a cable 210, a sprocket chain could be provide.

It is important to note that since the spring and adjacent portion of the cable assembly are contained within the tubular portion 200a of the gusset 200 and also within the lower tubular portion of the leg 70b, the spring assembly is protected against weather and damage. The width of the assembly from the bottom rail of the vehicle container is less than three inches, thereby affording a low profile.

Figure 31:
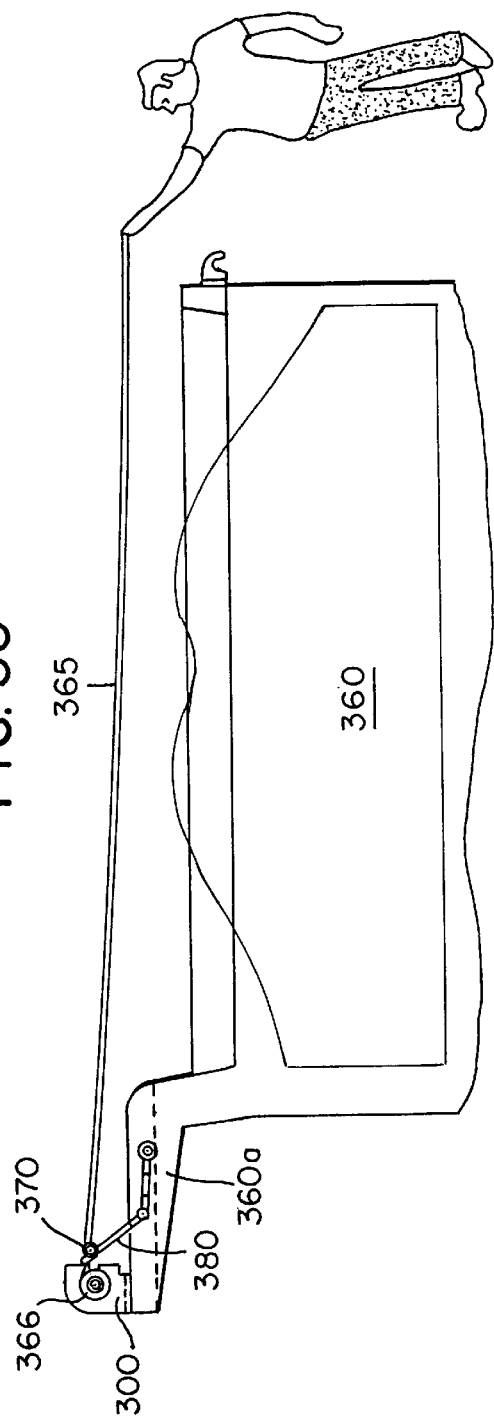

Referring now to FIGS. 28–31, a further embodiment of the invention is shown wherein the use of the pivoted tarp cover arm is eliminated, and a simple arrangement is provided having a transversely extending tarp pull bar 370, a manually operable rope 365, and a locking bracket 374 mounted on the rear wall of the vehicle body 360. Referring first to FIG. 28, when the tarp cover 364 is in its closed condition covering the open top of the vehicle body 360, the pull bar member 370 is locked beneath the bracket 374, and the pull rope 365 is wound around a bracket means 374. To uncover the vehicle body 360, the operator merely releases the pull rope 365, and the cover 364 is progressively wound upon the roll 366 which is driven by the motor means M. The roll 366 is supported by the roll support 360 provided at the forward end of the cab shield 360a. In this embodiment, rather than being an electrical motor as in the embodiment of FIG. 13, the motor M is a spring motor (such as a spiral spring M as shown in FIG. 28). As the operator releases the pull rope 365, the hold down arm 380 is pivoted in the counter clockwise direction about its spring-biased pivot means 384, and when the pull bar 370 engages the hold-down arm, it is further pivoted in the counter-clockwise direction toward the final position of FIG. 31 with the pull bar 370 being adjacent the tarp cover roll 366. To again cover the vehicle container body 360, the operator merely manually pulls the pull rope 365 as shown in FIG. 31, and as the pull bar 370 is progressively displaced to the rear, the hold-down arm 380 is spring biased in the clockwise direction toward the hold down position of FIG. 28, thereby applying downward tension upon the forward end portion of the cover 364, and thereby tension the same relative to the rear edge 394 of the ledge. The pull rope 365 is then again wound around the locking bracket 374 to fasten the tarp cover 364 in its closed position. As in the embodiment of FIGS. 7 and 10, the transverse portion 380a of the hold-down arm has a length that is less than the spacing distance between the container side walls, whereby the hold-down arm is operable to extend partially within the container as shown in FIG. 28.

While in accordance with the provisions of the Patent Statutes, the preferred forms and embodiments of the invention have been illustrated and described, it will be apparent to those skilled in the art that various changes may be made without deviating from the inventive concepts set forth above.

What is claimed is:

1. A tarp cover system for a container body having first and second end walls, opposite side walls, and an open top, comprising:
   a flexible cover having first and second ends, said first end connected to the container body adjacent the first end wall for deployment across the open top of the container body toward the second end wall;
   means connected to said second end of said cover for deploying said cover across the open top of the container body toward the second end wall; and
   a hold-down arm pivotably connected to the container body adjacent said first end of said cover, said hold-down arm having a transverse portion extending across the open top of the container body between the opposite side walls and having a length that is less than the spacing distance between the opposite side walls.

2. The tarp cover system according to claim 1, further comprising hold-down spring means biasing said hold-down arm toward a first hold-down position in which said transverse portion is in engagement with an upper surface of said cover when said cover is deployed across the open top of the container body to thereby hold down a portion of said cover adjacent said first end.

3. The tarp cover system according to claim 1, wherein said hold-down arm is generally U-shaped with a pair of leg portions connected to said transverse portion, said pair of leg portions each having a free end connected to the container body.

4. The tarp cover system according to claim 3, further comprising a pair of pivot means for pivotally connecting said free ends of said leg portions to the container body.

5. The tarp cover system according to claim 1, wherein said means for deploying includes:
   a cover arm transverse portion connected to said second end of said cover;
   at least one cover arm leg portion pivotably connected at one end to a side wall of the container body; and
   means for connecting said cover arm transverse portion to said cover arm leg portion such that said cover arm transverse portion is biased away from said leg portion except when said cover is in tension.

6. The tarp cover system according to claim 1, further comprising locking means for automatically locking said second end of said cover to the container body adjacent the second end wail of the container body.

7. The tarp cover system according to claim 6, wherein said means for deploying includes:
   a cover arm transverse portion connected to said second end of said cover;
   at least one cover arm leg portion pivotably connected at one end to a side wail of the container body; and
   means for connecting said cover arm transverse portion to said cover arm leg portion such that said cover arm transverse portion is biased away from said leg portion except when said cover is in tension.

8. The tarp cover system according to claim 7, wherein said locking means includes a bracket connected to the second end wall of the container body, said bracket arranged to engage said cover arm transverse portion when said second end of said cover is adjacent the second end wall of the container body and said cover arm transverse portion is biased away from said cover arm leg portion.

9. A hold-down mechanism for use with a flexible cover system deployable over an open-topped container body from a first end of the container body toward an opposite second end of the container body, comprising a hold-down arm pivotably connectable to the first end of the container body, said hold-down arm having a transverse portion configured for contacting the flexible cover system, said transverse portion extending across the open-topped container body between opposite side walls of the container body and having a length that is less than the spacing distance between the opposite side walls of the container body.

10. The hold-down mechanism according to claim 9, further comprising hold-down spring means biasing said hold-down arm toward a first hold-down position in which said transverse portion is in engagement with an upper surface of the cover system when the cover system is deployed across the open-topped container body to thereby hold down a portion of the cover system adjacent the first end of the container body.

11. The tarp cover system according to claim 9, wherein said hold-down arm is generally U-shaped with a pair of leg portions connected to said transverse portion, said pair of leg portions each having a free end connectable to the container body.

12. The tarp cover system according to claim 11, further comprising a pair of pivot means for pivotally connecting said free ends of said leg portions to the container body.

13. A tarp cover system for a container body having front and rear end walls, opposite side walls, and an open top, comprising:

a flexible cover having first and second ends, said first end connected to the container body for deployment across the open top of the container body;

means connected to said second end of said cover for deploying said cover across the open top of the container body; and a hold-down arm pivotably connected to the container body adjacent said first end of said cover, said hold-down arm including:
- a transverse portion extending across the open top of the container body between the opposite side wails; and
- at least one leg portion having a first leg section connected at one end to said transverse portion, a second leg section connected at a free end to the container body, and an adjustable locking means for connecting said first leg section to said second leg section at adjustable orientations relative to said second leg section.

14. The tarp cover system according to claim 13, further comprising hold-down spring means biasing said hold-down arm toward a first hold-down position in which said transverse portion is in engagement with an upper surface of said cover when said cover is deployed across the open top of the container body to thereby hold down a portion of said cover adjacent said first end.

15. The tarp cover system according to claim 14, wherein said hold-down arm is generally U-shaped with a pair of leg portions connected to said transverse portion, each of said pair of leg portions including a first leg section, a second leg section and adjustable locking means for connecting said first leg section to said second leg section at adjustable orientations relative to said second leg.

16. The tarp cover system according to claim 15, further comprising a pair of pivot means for pivotally connecting said free end of said second sections of each of said leg portions to the container body.

* * * * *